Sept. 6, 1927.

C. B. OFFICER

MINING MACHINE TRUCK

Original Filed Nov. 3, 1917

1,641,862

Inventor.
Chas. B. Officer.
by
Atty.

Patented Sept. 6, 1927.

1,641,862

UNITED STATES PATENT OFFICE.

CHARLES B. OFFICER, OF WINNETKA, ILLINOIS, ASSIGNOR TO SULLIVAN MACHINERY COMPANY, A CORPORATION OF MASSACHUSETTS.

MINING-MACHINE TRUCK.

Application filed November 3, 1917, Serial No. 200,050. Renewed May 21, 1927.

My invention relates to mining machine trucks.

It has for its object to provide a truck of improved and simplified construction whereby the loading or unloading of a mining machine is facilitated. A further and more specific object of my invention is to provide a truck having improved cooperating means adapted to cooperate with the truck and with the machine during the loading and unloading operation. These and other objects of my invention will, however, hereinafter more fully appear.

In the accompanying drawings, I have shown for purposes of illustration two embodiments which my invention may assume in practice.

In these drawings,—

Figure 1:
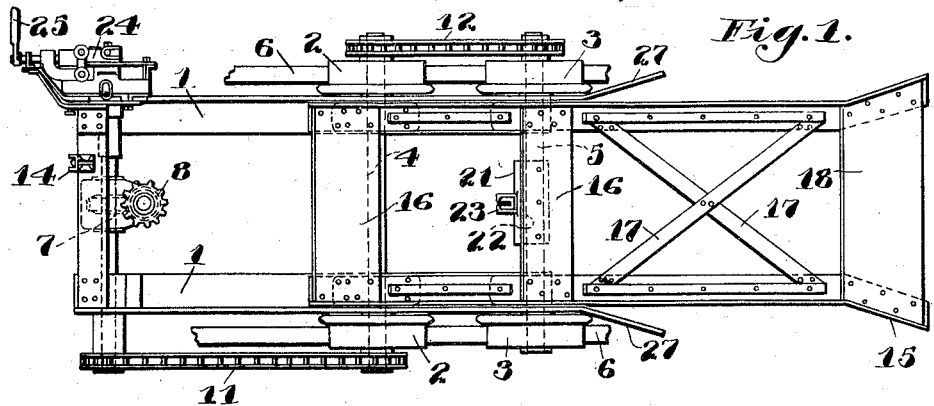
Fig. 1 is a plan view of a truck equipped with my improvement.

In this illustrative construction, I have disclosed a truck comprising a rigid machine supporting and guiding frame 1 mounted upon wheels 2 and 3, respectively carried upon rear and front axles 4 and 5, and adapted to move upon the usual track 6, the front end of the frame being transversely connected by the axles and extending only to a point adjacent the front axle. As in the usual construction, this frame is propelled through suitable truck driving mechanism 7 disposed at the rear end of the same and provided with a suitable rotatable element 8 adapted to be engaged by a rotating part 9, of a mining machine 10 and to impart its rotation through suitable driving mechanism including a chain and sprocket connection 11 to the rear axle 4, the latter being connected through a similar chain and sprocket connection 12 to the front axle 5. As usual in such machines, a flexible element, or feed member, such as the chain 13, is adapted to be connected to a suitable feed member abutment, as for instance a chain fork 14, at the rear of the truck frame 1, during the loading operation, the machine being fed along this chain into its loaded position.

Figure 2:
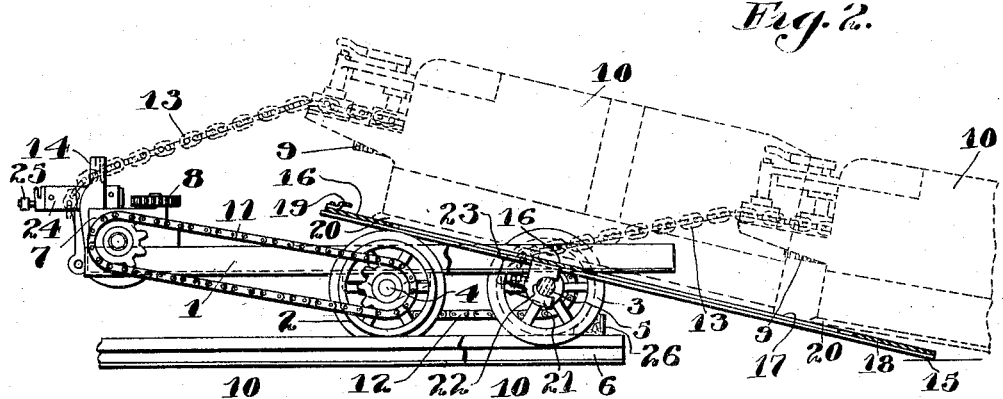
Fig. 2 is a side elevation, partially in section, of the truck in loading or unloading position, a mining machine being shown in a plurality of positions thereon.

In my improvement, it will be noted that I have provided upon the frame 1 a cooperating or supplemental guiding member or element 15 preferably comprising a flat bottom and upstanding side flanges and adapted to guide the machine in its movement toward or from the truck and to be compactly disposed in loaded position in a plane beneath the tops of the truck wheels and adjacent the truck axles, and there to underlie the machine in the loaded position of the latter upon the frame 1. As shown, this element 15 comprises suitable longitudinally disposed angle iron elements suitably connected transversely by cross members 16 disposed at its rear end and slightly in rear of its middle, and suitably braced at points intermediate their ends and adjacent their front end by crossing diagonals 17 disposed between the middle cross member 16 and a flared, transversely disposed front machine receiving member 18. It will thus be observed that a very rigid construction is produced having an opening between the front and rear members 16. At a point at its rear end, this member 15 is also provided with a stop 19 adapted to engage with the front end of a shoe 20 on the mining machine, as hereinafter more fully brought out. Attention is also directed to the fact that at a point substantially midway between its ends, herein slightly in rear of a point midway between its ends, and in front of the stop 19, this element 15 is provided with means whereon the element may be tilted vertically, herein comprising a centrally located depending portion 21 reciprocable therewith between the axles 4 and 5 and provided with a suitable journal surface 22 adapted to engage with the front axle 5. It will also be observed that in the form of my invention shown in Figs. 1, 2, and 3, this member 21 is provided with a suitable feed member abutment, herein a chain fork 23, on its rear side adapted to receive the chain during the loading operation.

Figure 3:
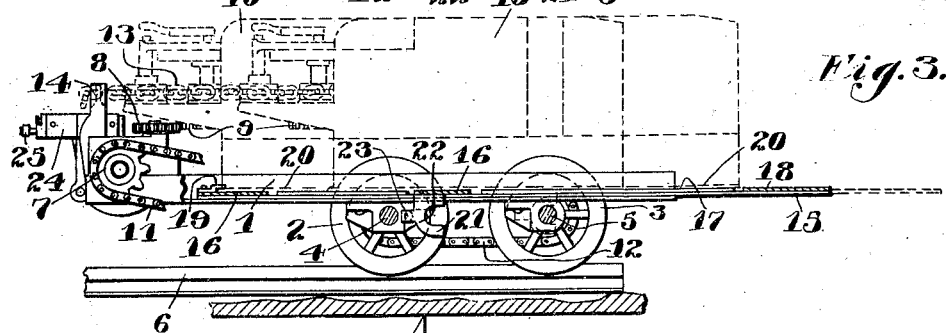
Fig. 3 is a side elevation, partially in section, of the truck in transport position, a mining machine also being shown in a plurality of positions thereon.

In describing the use of my invention, let us assume that the parts are in the left-hand dotted line position shown in Fig. 3, i. e. the position which the same would occupy during transport. When it is desired to unload the machine, as when the truck has been propelled into a room and adjacent the track end and the mine face, it is only necessary to connect the chain 13 of the machine to a point adjacent the face in order that the machine may be propelled under its own power along this chain and relative to the truck and toward the face. As the machine moves to the right from the position shown in Fig. 3, it will obviously, due to its weight, carry with it the element 15, causing the portion 21 thereof to be reciprocated between the axles 4 and 5. As, however, the machine moves further forward and its center of gravity passes out beyond the front of the truck, the depending portion 21 on the element 15 will come into engagement with the front axle 5 so that as the weight of the machine tends to move downward, the journal 22 on this member 21 may move about the front axle as a pivot, and, unless the element 15 has already tilted under the weight of the machine, thus enable that element to swing about a pivot in rear of its middle and assume the position shown in Fig. 2, wherein it is disposed at an angle relative to and supported at a point intermediate its ends on the truck frame 1, herein at a point substantially mid-way between its ends, with its rear end in the air and its front end in engagement with the bottom, in such a manner as to provide a slide over which the machine may be conveniently and readily unloaded upon the bottom, or loaded back onto the truck. It will also be noted that due to proper balancing of the parts, herein arising from the fact that the element 21 is located slightly in rear of the middle of the element 15, that element will remain in this tilted or sloping position after the machine has passed off of the same or until it is desired to re-load the machine upon the truck. During this latter operation, it will be understood that the chain 13 is connected to a point in advance of the then rearwardly moving machine. In this instance, if desired, the chain may be first connected to the feed member abutment on the machine guiding frame, herein to the chain fork 23 formed on the member 21, the point of pull thus being located in such a manner as to enable the machine to be drawn readily rearward up the inclined element 15 and at the same time tend to hold the part 15 in the desired rigid relation relative to the frame 1 during the first stages of the machine movement onto and over the element 15. If desired, however, the chain 13 may be at once connected to the feed abutment member or chain fork 14 or may be connected to the chain fork 23 and thereafter connected to the chain fork 14, as circumstances require although I consider the latter connection preferable in view of the fact that in certain forms of my invention the rear end of the machine guiding frame extends into the path of the flexible feeding member connected between the machine and the abutment or chain 14. Obviously, during the rearward movement of the machine, which would result from this anchoring of its feed chain, and the feeding of the machine along the chain, the machine will eventually pass onto the rear end of the element 15 and in rear of the pivot thereof and thereby cause the latter to rock about its pivot preferably very shortly after the shoe 20 on the machine has engaged with the stop 19 on the element 15. Thus it will be noted that the machine automatically causes not only a rocking movement of the element in question, but a reciprocatory movement of the same relative to the frame 1 until the parts assume the position shown in Fig. 3, wherein the driving element 9 on the machine is in mesh with the member 8 on the truck and the truck is ready for transport.

In my improved construction, it will of course be understood that during the operation of loading or unloading the machine from the truck, it is desirable for the wheels of the truck to be held stationary. This result may be readily accomplished by the use of the usual controlling mechanism provided on the truck and herein shown to assume the form of a combined clutch and brake mechanism 24 adapted to be controlled by a suitable single controlling lever 25. It will also be noted that if desired, for any reason, to eliminate this mechanism or to use my invention in connection with another type of truck, the latter may be readily fixed in position by other means, as, for instance, inserting a suitable block or chock 26 in front or in rear of its front wheels. It will also be evident that in the use of my invention wherein the element 15 is preferably substantially flat on its surface, suitable guides 27 disposed angularly with respect to the frame 1 and sloping toward the machine receiving portion thereof may be provided on opposite sides of that frame so that when a machine is brought up over the element 15 at an angle it will be deflected by these guides into proper position relative to the element 15 and the truck frame 1.

Figure 4:
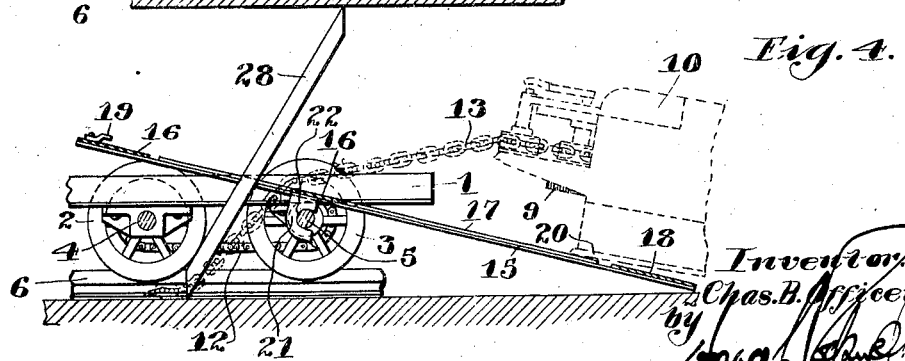
Fig. 4 is a side elevation, partially in section, of a modified form of the construction shown in Figs. 1 to 3.

In the embodiment of my invention shown in Fig. 4, it will be noted that a construction of substantially the same description as that above set forth is shown, although in this instance it will be observed that instead of providing the chain fork 23 upon the element 21, a jack 28 is inserted through the opening between the members 16 and at a point slightly in rear of the member 21 and fixed in the mine bottom and the roof, the chain 13 of the machine being passed over the forward transverse brace 16 and fixed to the mine bottom by this jack. Thus, it will be observed that, in the illustrative construction shown, substantially the same results in the loading operation are obtainable without the provision of a separate or special chain fork upon the member 21. In this construction, as in the preceding construction, obviously, if desired, the jack 28 may be taken down after the machine has advanced a certain distance over the element 15, and the chain 13 then connected to the usual chain fork provided at the rear of the machine and not shown in this view.

As a result of my improved construction, it will be observed that an exceedingly simple and rugged construction is provided which is adapted to permit loading and unloading of the mining machine with increased facility, the mining machine automatically acting to disengage itself from the truck driving mechanism, move the front end of the guiding frame nearer the face, and tilt the same into an inclined position wherein it is supported on the front end of the wheeled truck at a convenient angle to the bottom and in such a position as to be balanced when the machine is moved off of the same. Also it will be noted that this position is such as to permit ready return of the machine up the smooth incline provided, and certain lowering and rearward movement of the machine and guiding frame when the former travels up onto the overhanging rear end of the latter and continues its rearward movement. Attention is also directed to the fact that the illustrative construction shown herein may not only be very readily and cheaply manufactured, but may be adapted to use upon trucks of standard construction without material change, the element 15 being adapted to cooperate with a front axle of standard type. It will also be observed that by the utilization of a member such as the member 21, adapted to cooperate with the front axle, it is possible to provide a pivotal connection of such width as effectively to overcome any tendency of the truck element 15 to swing laterally relative to the truck when struck by a machine brought up at an odd angle, and that such a machine is free to slide over the surface of the element 15 and be deflected into its proper position relative to the truck frame 1 by the cooperating machine deflecting means or guards 27 above described. These and other advantages of my improved construction will, however, be clearly apparent to those skilled in the art.

While I have in this application specifically described two embodiments which my invention may assume in practice, it will be understood that the same are shown for purposes of illustration and that the invention may assume various other forms without departing from its spirit, it being my intention to include all such modifications within the scope of the appended claims.

What I claim as new and desire to secure by Letters Patent is:

1. A mining machine truck, and a tiltable machine guiding frame reciprocable thereon and when tilted supported thereon intermediate its ends, at a point substantially spaced from each of the latter, said machine guiding frame when in the tilted position providing an inclined plane onto and up which a mining machine may slide during loading of the latter on said truck.

2. A mining machine truck, and a tiltable machine guiding frame pivotally connectable thereto substantially midway between the ends of said frame and movable reversely longitudinally on said truck, said machine guiding frame when in the tilted position providing an inclined plane onto and up which a mining machine may slide during loading of the latter on said truck.

3. A mining machine truck, a tiltable machine guiding frame pivotally mounted thereon, and means for loading a mining machine onto said frame when the latter is in tilted position comprising feed member abutments on said frame and the rear end of said truck.

4. A mining machine truck, a tiltable machine guiding frame movable reversely longitudinally thereon, and means for loading a mining machine onto said frame when the latter is in tilted position comprising feed member abutments on said frame and the rear end of said truck.

5. In a mining machine truck, a wheeled frame having a front axle, and a reciprocable supplemental machine guiding member thereon pivotally connectable with said axle.

6. In a mining machine truck, a wheeled frame having a front axle, and a reciprocable supplemental machine guiding member thereon pivotally connectable with said axle as it is moved forward over said frame.

7. In a mining machine truck, a wheeled frame having a front axle, and a machine guiding member disposed at an angle to said frame and pivotally connected to said axle and reciprocable on said frame.

8. In a mining machine truck, a wheeled frame having a front axle, and a machine guiding member disposed at an angle to said frame and pivotally connected to said axle and reciprocable by a machine loaded thereon.

9. In a mining machine truck, a wheeled guiding frame having front and rear axles, and a supplemental guiding member thereon reciprocable between the limits of said axles and pivotally connectable with one of the same.

10. In a mining machine truck, a wheeled guiding frame having front and rear axles, and a supplemental guiding member thereon reciprocable between the limits of said axles and pivotally connectable with said front axle.

11. In a mining machine truck, a wheeled frame having front and rear axles, and a reciprocable guiding member thereon having a depending pivot member engageable with one of said axles after a limited reciprocation relative to said frame.

12. In a mining machine truck, a wheeled frame having its front axle at its front end, a supplemental guiding member thereon reciprocable on said frame, and means for pivotally connecting said member with said axle after a limited reciprocation of said member.

13. In a mining machine truck, a wheeled frame having its front axle at its front end, a supplemental guiding member thereon reciprocable on said frame, and depending means for pivotally connecting said member with said axle after a limited reciprocation of said member.

14. In a mining machine truck, a wheeled frame having its front axle at its front end, a supplemental guiding member thereon reciprocable on said frame, means operable after a limited reciprocation of said member for pivotally connecting the same with said axle, and means on said member engageable with a load movable thereover.

15. In a mining machine truck, a wheeled frame having its front axle at its front end, a supplemental guiding member thereon reciprocable on said frame, means operable after a limited reciprocation of said member for pivotally connecting the same with said axle, and means on said member for connecting a feeding element thereto.

16. In a mining machine truck, a wheeled machine guiding frame having a relatively short front portion and angularly disposed cooperating guides, and a relatively movable supplemental guiding member thereon pivotally mounted at a point between its ends and disposed in sloping position relative to the frame between said cooperating guides.

17. In a mining machine truck, a wheeled machine guiding frame having a relatively short front portion and angularly disposed cooperating guides, and a supplemental guiding member disposed in sloping position between said cooperating guides and resting on said frame at a point intermediate its ends.

18. In a mining machine truck, a wheeled frame having front and rear axles, a cooperating guiding member pivotally connected with said front axle and having an opening intermediate its ends, a load forming element, and a flexible connection between the same and said cooperating member extending through said opening.

19. In a mining machine truck, a wheeled frame having front and rear axles, a cooperating guiding member pivotally connected with said front axle and having an opening intermediate its ends, a self-feeding mining machine thereon, a feeding member therefor having one end extending from said machine through said opening, and means for fixing said end.

20. In a mining machine truck, a wheeled frame, a supplemental guiding member inclined relative thereto, a mining machine having a flexible feeding member, and means whereby as said machine is loaded upon said guiding member said flexible feeding member is utilized to hold said guiding member in rigid relation with respect to said frame.

21. In a mining machine truck, a wheeled machine guiding frame having a relatively short front portion and angularly disposed cooperating guides, and a reciprocable guiding member disposed in sloping position between said cooperating guides and resting on said frame at a point intermediate its ends.

22. In a mining machine truck, a wheeled frame having front and rear axle members, means for holding said frame stationary, a cooperating reciprocable guiding member supported on said frame in retracted position during transport, and means carried on said member and cooperating with said front axle to form a pivot thereon after a limited reciprocation of said member.

23. In a mining machine truck, a wheeled frame having front and rear axle members, means for holding said frame stationary, a reciprocable guiding member supported on said frame, means carried on said guiding member and cooperating with said front axle to form a pivot, and means carried on said member and engageable with a load movable relative thereto.

24. In mining machine truck, a wheeled frame having front and rear axle members, means for holding said frame stationary, a supplemental guiding member normally supported on said frame, means carried on said guiding member and cooperating with said front axle to form a pivot, means carried on said member for engaging with a load movable relative thereto, and means on said member for attaching a feeding member thereto.

25. In a mining machine truck, a wheeled machine guiding frame having a relatively short front portion and angularly disposed cooperating guides, a supplemental substantially flat guiding member disposed in sloping position intermediate said cooperating guides and resting on said frame at a point intermediate its ends, and means whereby said member may be tilted and reciprocated into transport position on said frame.

26. In a mining machine truck, a wheeled machine guiding frame having a relatively short front portion and angularly disposed cooperating guides having a fixed relation to the wheeled frame, and a reciprocable supplemental guiding member thereon pivotally connectible thereto at a point between its ends and disposable in a sloping position relative to the frame between said cooperating guides.

27. In a mining machine truck, a wheeled truck having front and rear axles, a machine guiding member movable longitudinally relative thereto and tiltable about a transverse axis located at a point intermediate the ends of said guiding frame, said guiding frame being tiltable after a limited longitudinal movement of said frame relative to said truck frame, and means intermediate the ends of said frame engageable with the front axle of said truck.

28. In a mining machine truck, a wheeled truck having front and rear axles, a machine guiding member movable longitudinally relative thereto and tiltable about a transverse axis located at a point intermediate the ends of said guiding frame, said guiding frame being tiltable after a limited longitudinal movement of said frame relative to said truck frame, and means pivotally connectable with the front axle of said truck.

29. In a mining machine truck, a wheeled truck, a machine guiding frame slidable longitudinally relative thereto, and means operable after a forward longitudinal movement of said guiding frame to tilt the latter into inclined position at the front end of said truck with its front end engageable with the bottom, its intermediate portion supported on the front end of said truck, and its rear end projecting upward and rearward from its point of support.

30. In a mining machine truck, a wheeled truck, a machine guiding frame slidable longitudinally relative thereto, and means including a pivot member slidable longitudinally therewith operable after a forward longitudinal movement of said frame to tilt the latter into inclined position at the front end of said truck with its front end supported by the bottom, its intermediate portion supported by the front end of said truck at a point substantially midway between the ends of said frame, and its rear end projecting a substantial distance upward and rearward from its point of support on the truck.

31. In a mining machine truck, a wheeled truck, a machine guiding frame slidable longitudinally relative thereto, truck wheel driving mechanism on said truck including a member engageable by a mining machine on said guiding frame, and means operable after a forward longitudinal movement of said guiding frame to tilt the latter into inclined position at the front end of said truck with its front end engageable with the bottom, its intermediate portion supported on the front end of said truck, and its rear end projecting upward and rearward from its point of support.

32. The combination with a rigid upstanding wheeled truck frame, of a machine guiding frame carried thereon and slidable longitudinally relative thereto, and means whereby said guiding frame after a forward longitudinal movement of the latter with a machine on said truck frame is moved into inclined position and held against further longitudinal movement at the front end of said truck frame with its front end supported by the bottom, its intermediate portion supported by the front end of said truck frame, and its rear end projecting a substantial distance upward and rearward from its point of support on the truck frame, said guiding frame when in such inclined position providing an inclined plane onto, and along which a mining machine may slide during loading or unloading thereof.

33. The combination with a rigid upstanding wheeled truck frame, of a machine guiding frame thereon disposable in a horizontal plane below the tops of the wheels thereof and pivotally supported for tilting movement on the front end of said truck frame at a point substantially midway between the ends of said guiding frame and in tilted position having its front end supported by the mine bottom and its rear end projecting a substantial distance upward and rearward from its point of support on the truck, and a feed member abutment on said machine guiding frame.

34. The combination with a rigid upstanding wheeled truck frame, of a machine guiding frame thereon disposable in a horizontal plane below the tops of the wheels thereof and pivotally supported for tilting movement on the front end of said truck frame at a point substantially midway between the ends of said guiding frame and in tilted position having its front end supported by the mine bottom and its rear end projecting a substantial distance upward and rearward from its point of support on the truck, and a feed member abutment on said truck frame.

35. The combination with a rigid upstanding wheeled truck frame, of a machine guiding frame thereon disposable in a horizontal plane below the tops of the wheels thereof and pivotally supported for tilting movement on the front end of said truck frame at a point substantially mid-way between the ends of said guiding frame and in tilted position having its front end supported by the mine bottom and its rear end projecting a substantial distance upward and rearward from its point of support on the truck, a feed member abutment on said machine guiding frame, and truck wheel driving mechanism driven by a mining machine on said guiding frame.

36. The combination with a rigid upstanding wheeled truck frame, of a machine guiding frame thereon disposable in a horizontal plane below the tops of the wheels thereof and pivotally supported for tilting movement on the front end of said truck frame at a point substantially mid-way between the ends of said guiding frame and in tilted position having its front end supported by the mine bottom and its rear end projecting a substantial distance upward and rearward from its point of support on the truck, a feed member abutment on said machine guiding frame, a feed member abutment on said truck frame, and truck wheel driving mechanism driven by a mining machine on said guiding frame.

37. The combination with a rigid upstanding truck frame, of a machine guiding frame pivotally supported for tilting movement on the front end of said truck frame at a point substantially midway between the ends of said guiding frame and in tilted position having its front end supported by the mine bottom and its rear end projecting a substantial distance upward and rearward from its point of support on the truck, a feed member abutment on said truck frame in rear of said guiding frame, a feed member abutment carried by said guiding frame, and a truck wheel driving member on said truck frame rotatable by a mining machine on said frame.

38. The combination with a rigid upstanding truck frame, of a machine guiding frame pivotally supported for tilting movement on the front end of said truck frame at a point substantially midway between the ends of said guiding frame and in tilted position having its front end supported by the mine bottom and its rear end projecting a substantial distance upward and rearward from its point of support on the truck, a feed member abutment on said truck frame in rear of said guiding frame, means forming a feed member abutment intermediate the ends of said guiding frame, and a truck wheel driving member on said truck frame rotatable by a mining machine on said guiding frame.

39. The combination with a rigid upstanding truck frame, of a machine guiding frame pivotally supported for tilting movement on the front end of said truck frame at a point substantially midway between the ends of said guiding frame and in tilted position having its front end supported by the mine bottom and its rear end projecting a substantial distance upward and rearward from its point of support on the truck, a feed member abutment on said truck frame in rear of said guiding frame, a feed member abutment carried by said guiding frame, and truck wheel driving mechanism on the rear end of said truck frame including a member meshing with a moving part of a mining machine on said guiding frame.

40. The combination with a rigid upstanding wheeled truck frame having an element thereon, of a tiltable machine guiding frame reciprocably mounted thereon, said machine guiding frame when in tilted position providing an inclined plane onto and up which a mining machine may slide during loading of the latter on the truck and having an element thereon engageable with said element on said truck frame when said guiding frame is in a predetermined position, said elements when in engaged relation permitting tilting movement of the guiding frame relative to the truck frame by gravity as the mining machine is unloaded therefrom.

41. The combination with a rigid upstanding wheeled truck frame having an abutment thereon, of a tiltable machine guiding frame reciprocably mounted on said truck frame, said machine guiding frame when in tilted position providing an inclined plane onto and up which a mining machine may slide during loading of the latter on the truck and having an abutment thereon engageable with said abutment on said truck frame for limiting movement thereof relative to said truck frame in one direction, said abutments when engaged permitting tilting movement of said guiding frame relative to said truck frame by gravity as the mining machine is unloaded therefrom.

42. The combination with a rigid upstanding wheeled truck frame having longitudinal guides and an abutment thereon, of a tiltable machine guiding frame reciprocably mounted on the guides on said truck frame and when in tilted position providing an inclined plane onto and up which a mining machine may slide during loading of the latter on said truck, and a depending abutment on said guiding frame engageable with said abutment on said truck frame for limiting forward movement thereof relative to said truck frame, said abutments cooperating to form a fulcrum to permit tilting of said guiding frame relative to said truck frame by gravity as the mining machine is unloaded therefrom.

43. The combination with a rigid upstanding wheeled truck frame having an abutment thereon, of a tiltable machine guiding frame reciprocably mounted on said truck frame and when in tilted position providing an inclined plane onto and up which a mining machine may slide during loading of the latter on the truck, said machine guiding frame having an abutment thereon engageable with said abutment on said truck frame for limiting movement thereof relative to said truck frame in one direction, said abutments when engaged permitting tilting movement of said guiding frame relative to said truck frame by gravity as the mining machine is unloaded therefrom, and a feed member abutment on said truck frame in rear of said guiding frame.

44. The combination with a rigid upstanding wheeled truck frame having an abutment thereon, of a tiltable machine guiding frame reciprocably mounted on said truck frame and when in tilted position providing an inclined plane onto and up which a mining machine may slide during loading of the latter on said truck, said machine guiding frame having an abutment thereon engageable with said abutment on said truck frame for limiting movement thereof relative to said truck frame in one direction, said abutments when engaged permitting tilting movement of said guiding frame relative to said truck frame by gravity as the mining machine is unloaded therefrom, a feed member abutment on said truck frame in rear of said guiding frame, and a truck wheel driving member on said truck frame rotatable by the mining machine on said guiding frame.

In testimony whereof I affix my signature.

CHARLES B. OFFICER.